(12) United States Patent
Padi et al.

(10) Patent No.: US 12,184,538 B2
(45) Date of Patent: Dec. 31, 2024

(54) CENTRALIZED METHOD FOR COMPUTING BYPASS/FRR (FAST RE-ROUTE) TUNNELS

(71) Applicant: AT&T Intellectual Property I, L.P., Atlanta, GA (US)

(72) Inventors: Narayan Padi, Cedar Knolls, NJ (US); Shweta Vachhani, Edison, NJ (US); Aswatnarayan Raghuram, Morganville, NJ (US); Juby J. Chacko, Gillette, NJ (US); Harpreet Ahluwalia, Holmdel, NJ (US); Kenichi Futamura, Middletown, NJ (US); Gagan Choudhury, Jackson, NJ (US); Alvin C. Goddard, Kendall Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 377 days.

(21) Appl. No.: 17/672,388

(22) Filed: Feb. 15, 2022

(65) Prior Publication Data

US 2023/0261980 A1 Aug. 17, 2023

(51) Int. Cl.
*H04L 45/28* (2022.01)
*H04L 43/0882* (2022.01)
*H04L 43/16* (2022.01)

(52) U.S. Cl.
CPC .......... *H04L 45/28* (2013.01); *H04L 43/0882* (2013.01); *H04L 43/16* (2013.01)

(58) Field of Classification Search
CPC ...... H04L 45/28; H04L 43/16; H04L 43/0882
See application file for complete search history.

(56) References Cited

U.S. PATENT DOCUMENTS

| 7,738,359 | B1 * | 6/2010 | Suryaputra | H04L 41/00 370/242 |
| 2002/0067693 | A1 * | 6/2002 | Kodialam | H04L 45/22 370/227 |
| 2003/0193898 | A1 * | 10/2003 | Wong | H04L 45/48 370/254 |
| 2006/0146696 | A1 * | 7/2006 | Li | H04L 47/15 370/218 |
| 2006/0182035 | A1 * | 8/2006 | Vasseur | H04L 45/24 370/252 |
| 2017/0093695 | A1 * | 3/2017 | Kebler | H04L 67/535 |

* cited by examiner

*Primary Examiner* — Brenda H Pham
(74) *Attorney, Agent, or Firm* — Guntin & Gust, PLC; Matthew Tropper

(57) ABSTRACT

Aspects of the subject disclosure may include, for example, obtaining for a first path carrying first network traffic a corresponding first alternate path; obtaining for a second path carrying second network traffic a corresponding second alternate path, at least a first portion of the first alternate path being the same as at least a second portion of the second alternate path; responsive to a first detected failure on the first path, causing communication of first re-directed network traffic via the first alternate path instead of via the first path; responsive to a second detected failure on the second path, detecting whether total traffic, including the first re-directed network traffic, on the first portion of the first alternate path meets a threshold; responsive to the detected meeting of the threshold, obtaining for the second path a corresponding back-up alternate path; and causing communication of second re-directed network traffic via the back-up alternative path instead of via the second path. Other embodiments are disclosed.

20 Claims, 14 Drawing Sheets

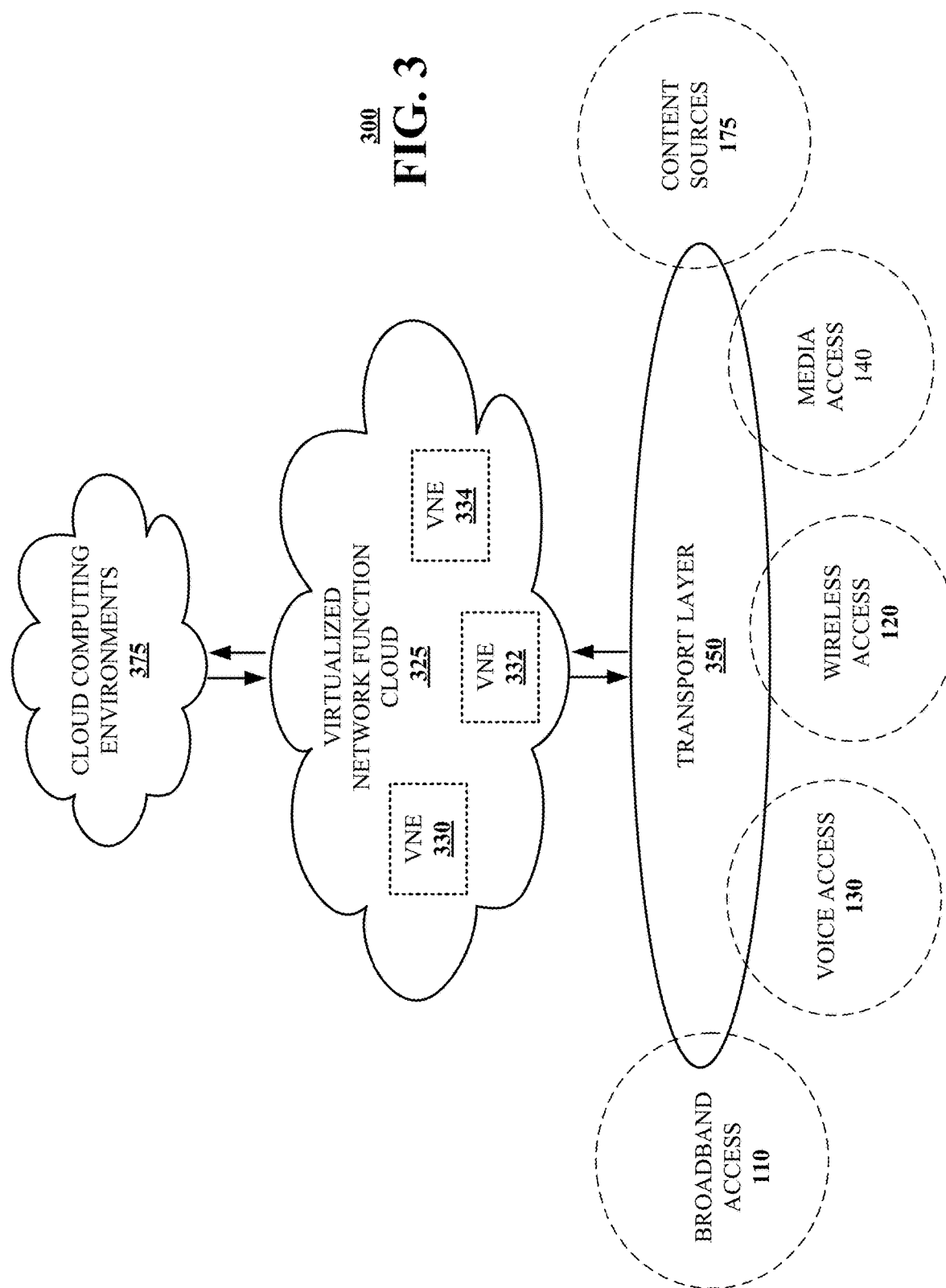

CENTRALIZED METHOD FOR COMPUTING BYPASS/FRR (FAST RE-ROUTE) TUNNELS

FIELD OF THE DISCLOSURE

The subject disclosure relates to a centralized method for computing bypass/FRR (Fast Re-Route) tunnels.

BACKGROUND

Networks often observe capacity loss due to failures. Conventional routers typically handle failure scenarios by applying fast re-routing (or bypass), where traffic quickly switches to alternate paths precomputed by the routers. However, these do not typically consider dynamic features of the network, such as link-bundle utilizations, partial failures, or proportion of priority traffic, and may not calculate optimal paths across all potential failures. This may lead to avoidable congestion and suboptimal paths.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
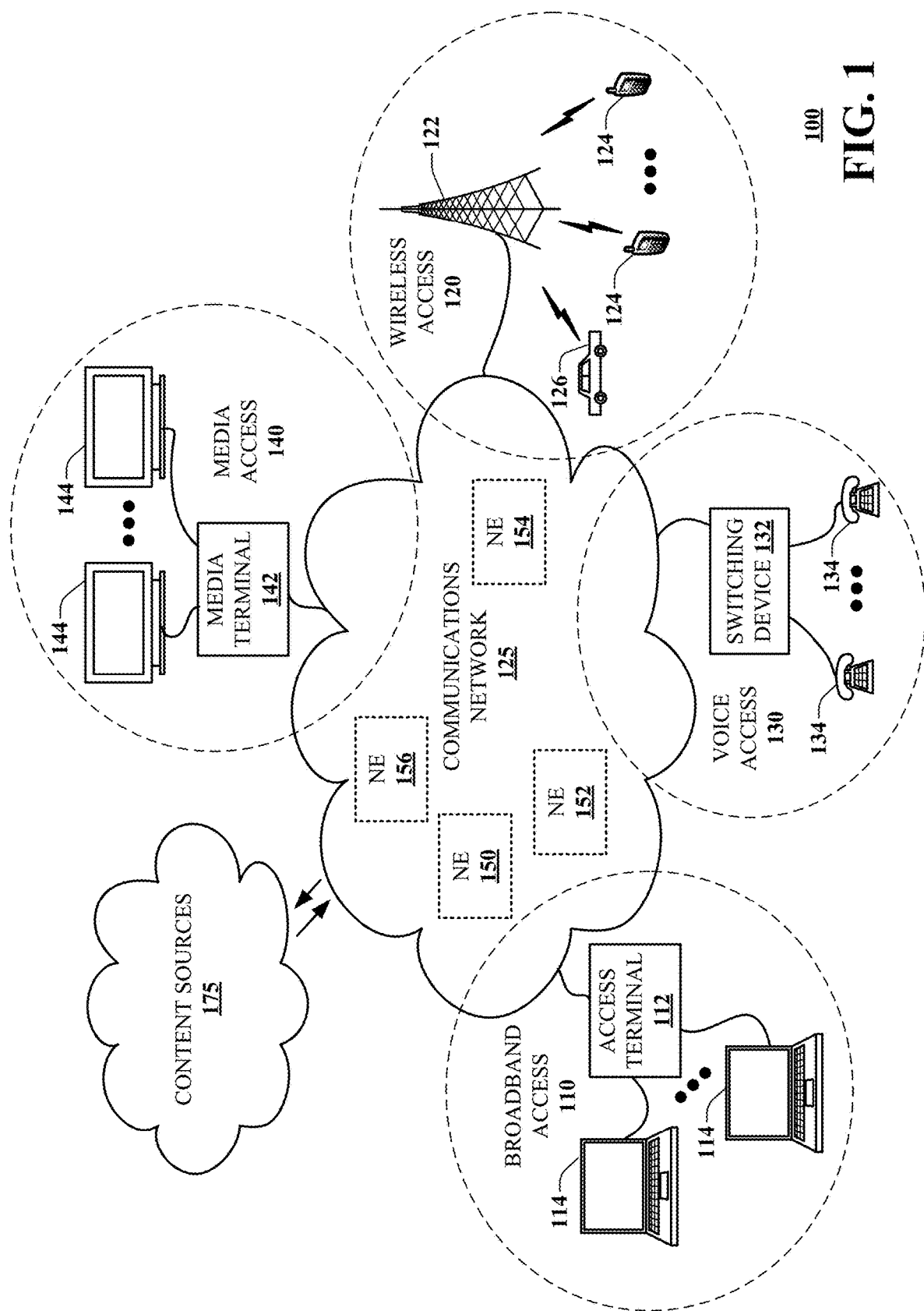
FIG. 1 is a block diagram illustrating an example, non-limiting embodiment of a communication network in accordance with various aspects described herein.

The subject disclosure describes, among other things, illustrative embodiments for computing bypass and/or fast re-route tunnels. Other embodiments are described in the subject disclosure.

One or more aspects of the subject disclosure include a centralized mechanism for updating fast re-route and/or bypass paths quickly and dynamically, considering real-time network conditions, such as tunnel priority link utilization, partial failures, and Shared Risk Link Group (SRLG) updates. The centralized mechanism can work for next-hop link-bypass tunnels, next-next-hop node-bypass tunnels, and other types of bypass tunnels. Various embodiments can account for interactions between the bypass paths themselves, reducing (or eliminating) the risk of congestion (or overload) from overlapping bypass paths. This can lead to less congestion and/or fewer dropped packets under failure.

One or more aspects of the subject disclosure include a device comprising: a processing system including a processor; and a memory that stores executable instructions that, when executed by the processing system, facilitate performance of operations, the operations comprising: obtaining for a first path that is carrying first network traffic from a first initial node to a first final node a corresponding first alternate path from the first initial node to the first final node, the first alternate path being different from the first path; obtaining for a second path that is carrying second network traffic from a second initial node to a second final node a corresponding second alternate path from the second initial node to the second final node, the second path being different from the first path, the second alternate path being different from the second path, and at least a first portion of the first alternate path being the same as at least a second portion of the second alternate path; detecting whether a first failure occurs on the first path, resulting in a first detected failure; responsive to the first detected failure, causing communication of first re directed network traffic via the first alternate path instead of via the first path; detecting whether a second failure occurs on the second path, resulting in a second detected failure; responsive to the second detected failure, detecting whether total traffic, including the first re-directed network traffic, on the first portion of the first alternate path meets a threshold, resulting in a detected meeting of the threshold; responsive to the detected meeting of the threshold, obtaining for the second path a corresponding back-up alternate path from the second initial node to the second final node, the back-up alternate path being different from each of the second path and the second alternate path; and causing communication of second re-directed network traffic via the back-up alternative path instead of via the second path.

One or more aspects of the subject disclosure include a non-transitory machine-readable medium comprising executable instructions that, when executed by a processing system including a processor, facilitate performance of operations, the operations comprising: detecting whether a first failure occurs on a first path of a network, resulting in a first detected failure, wherein the first path comprises a first starting node, a first ending node, one or more first intermediate nodes, and a first plurality of links facilitating communication from the first starting node to the first ending node via the one or more first intermediate nodes; responsive to the first detected failure, causing communication of first re-directed traffic via a first alternate path instead of via the first path, wherein the first alternate path comprises the first starting node, the first ending node, one or more first alternate intermediate nodes, and a first alternate plurality of links facilitating communication from the first starting node to the first ending node via the one or more first alternate intermediate nodes, and wherein at least one of the first alternate plurality of links differs from at least one of the first plurality of links; detecting whether a second failure occurs on a second path of the network, resulting in a second detected failure, wherein the second path comprises a second starting node, a second ending node, one or more second intermediate nodes, and a second plurality of links facilitating communication from the second starting node to the second ending node via the one or more second intermediate nodes, wherein at least a first portion of the first alternate path is the same as at least a second portion of a second alternate path, and wherein the second alternate path has been pre-computed as an alternate path for the second path; responsive to the second detected failure, detecting whether total traffic, including the first re-directed traffic, on the first portion of the first alternate path meets a threshold, resulting in a detected meeting of the threshold; responsive to the detected meeting of the threshold, dynamically obtaining for the second path a corresponding back-up alternate path from the second starting node to the second ending node, wherein the back-up alternate path is different from each of the second path and the second alternate path; and causing communication of second re-directed traffic via the back-up alternate path instead of via the second path.

One or more aspects of the subject disclosure include a method comprising: detecting, by a processing system including a processor, whether a first failure occurs on a first primary tunnel of a network, resulting in a first detected failure, wherein the first primary tunnel comprises a first starting router, a first ending router, and a first link between the first starting router and the first ending router, wherein the first link comprises a first link bundle, and wherein the first link bundle comprises a first plurality of sub-links; responsive to the first detected failure, causing by the processing system communication of first re-directed network traffic via a first alternate tunnel instead of via the first primary tunnel, wherein the first alternate tunnel comprises the first starting router, the first ending router, and a first alternate link between the first starting router and the first ending router, wherein the first alternate link comprises a first alternate link bundle, wherein the first alternate link bundle comprises a first alternate plurality of sub-links; and wherein the first alternate link differs from the first link; detecting, by the processing system, whether a second failure occurs on a second primary tunnel of the network, resulting in a second detected failure, wherein the second primary tunnel comprises a second starting router, a second ending router, and a second link between the second starting router and the second ending router, wherein the second link comprises a second link bundle, wherein the second link bundle comprises a second plurality of sub-links, wherein the second primary tunnel is different from the first primary tunnel, wherein at least a first portion of the first alternate tunnel is the same as at least a second portion of a second alternate tunnel, and wherein the second alternate tunnel has been pre-computed as an alternate tunnel for the second primary tunnel; responsive to the second detected failure, detecting by the processing system whether total traffic, including the first re-directed traffic, on the first portion of the first alternate tunnel is at or above a bandwidth threshold, resulting in a detected meeting of the bandwidth threshold; responsive to the detected meeting of the bandwidth threshold, dynamically obtaining by the processing system for the second primary tunnel a corresponding back-up alternate tunnel from the second starting router to the second ending router, the back-up alternate tunnel being different from each of the second primary tunnel and the second alternate tunnel; and causing by the processing system communication of second re-directed traffic via the back-up alternate tunnel instead of via the second primary tunnel.

In various embodiments, mechanisms can be provided to calculate alternate (e.g., FRR) paths for all tunnels (paths) and any failure (node, span, and/or SRLG) simultaneously, so that there is minimal congestion/packet loss under any failure. For example, for a tunnel A-B-C D, 3 FRR paths can be calculated—one each for failure of B, failure of C, and failure of C-D. And these can be calculated such that there would be minimal congestion with other tunnels and FRR paths (calculated simultaneously) triggered by any common failures.

Referring now to FIG. 1, a block diagram is shown illustrating an example, non-limiting embodiment of a system 100 in accordance with various aspects described herein. For example, system 100 can facilitate in whole or in part dynamic re-routing of network traffic depending upon total traffic flow on a path from one network node to another network node (in various specific examples, the dynamic re-routing can be in real-time or near real-time). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.1 in, 802.1 lac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Referring now to FIGS. 2A-2D, these are block diagrams illustrating an example, non-limiting embodiment of a system 200 (which can function fully or partially within the communication network of FIG. 1) in accordance with various aspects described herein. As seen in these figures, server 202 is in bi-directional communication with a network of nodes A, B, C, D, E, F, G, H. In one example, server 202 is in bi-directional communication with each of nodes A, B, C, D, E, F, G, H. In another example, each of nodes A, B, C, D, E, F, G, H is in bi directional communication with one or more of the other nodes via respective links (each of these links (A-B, B-D, A-C, C-B, B-G, D-H, C-G, C-E, G-H, E-F, G-F, F-H) is shown as a solid line connecting two nodes). In another example, each link can comprise a group (or bundle) of links. The server 202 can operate as described herein (e.g., in a centralized manner) to receive information from each of the nodes, to determine various paths to utilize, and/or to control each of the nodes to implement utilization of various paths. Further, server 202 is in bi-directional communication with database 203 (e.g., to retrieve therefrom one or more pre-computed paths for use as described herein). In one example, the server 202 can dynamically calculate optimal FRR and/or bypass routes periodically (e.g., once a week or once every 10 seconds). In one example, the actual rerouting under failure can be real-time (e.g., in milliseconds) since the FRR routes can be stored at the routers once calculated. In another example, the server can comprise a plurality of servers. In another example, each of the nodes can comprise one or more routers.

Figure 2A:
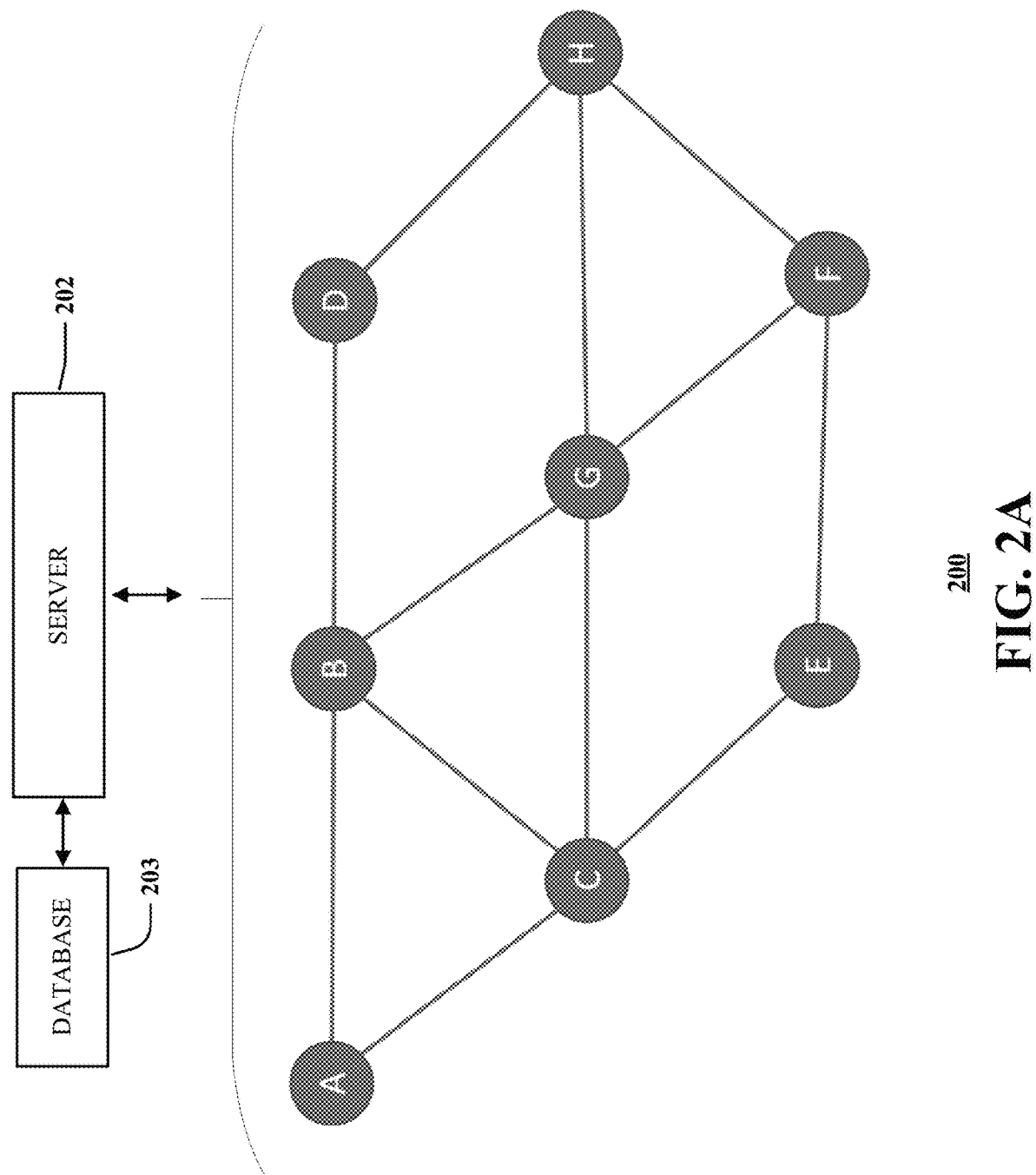
FIGS. 2A-2D are block diagrams illustrating an example, non-limiting embodiment of a system (that can function fully or partially within the communication network of FIG. 1) in accordance with various aspects described herein.
Figure 2B:
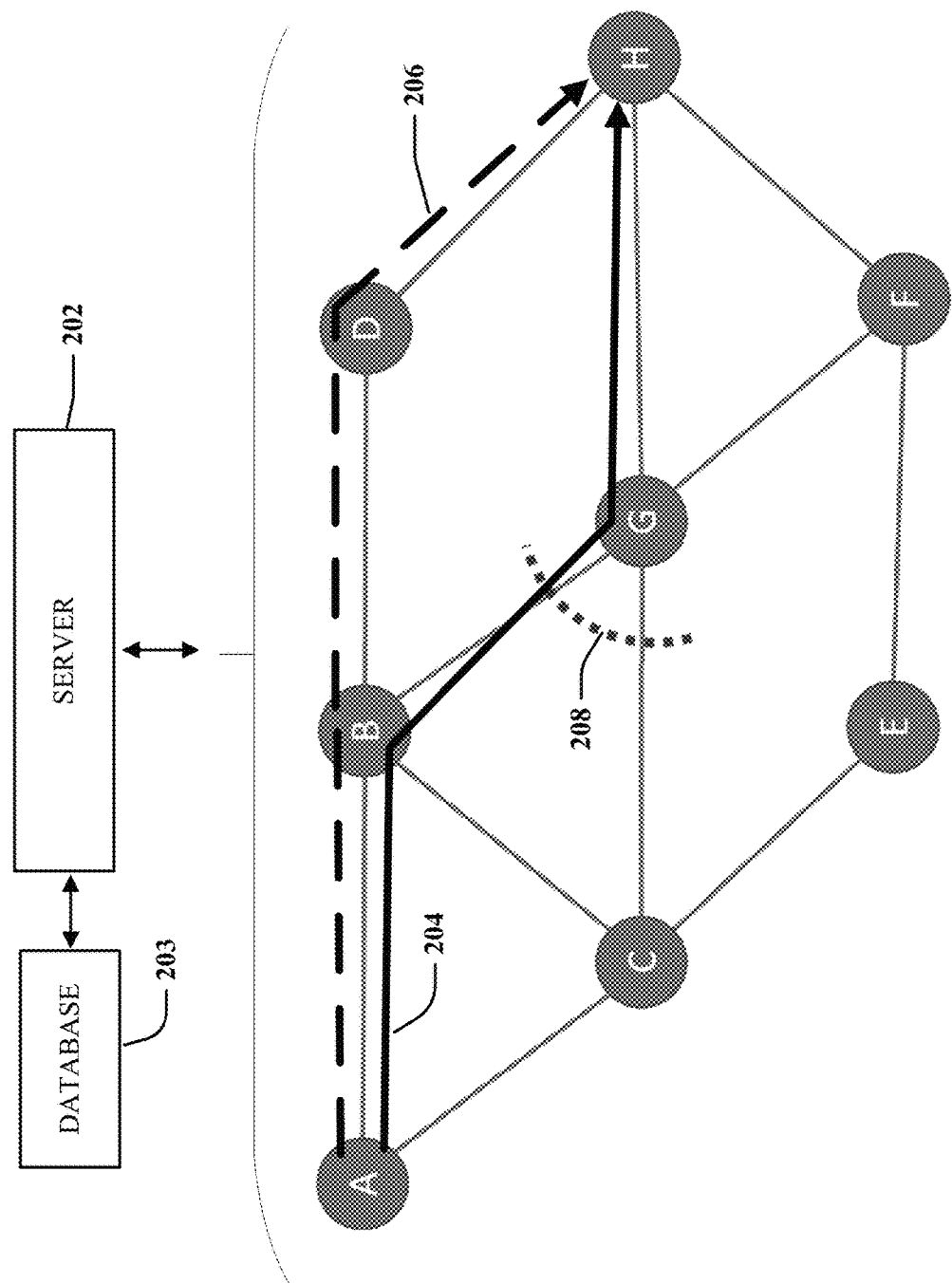

Referring now in particular to FIG. 2B, it is seen that in this example a first primary tunnel 204 exists between node A and node H (see the thick solid line on the path A-B-G-H). In addition, in this example, a first FRR tunnel (or first alternate path) 206 is pre-computed between node A and node H (see the thick dashed line on the path A-B-D-H). This pre-computed first alternate path 206 is to be used in the event of a link failure (shown by curved dashed line 208) which, in this example, represents an SRLG failure that takes out 2 links (B-G and C-G). In one example, each link failure can be a complete failure between two nodes. In another example, each link failure can be a partial failure between two nodes (e.g., one or more links of a given link bundle can fail while one or more other links of the link bundle can remain functional).

Figure 2C:
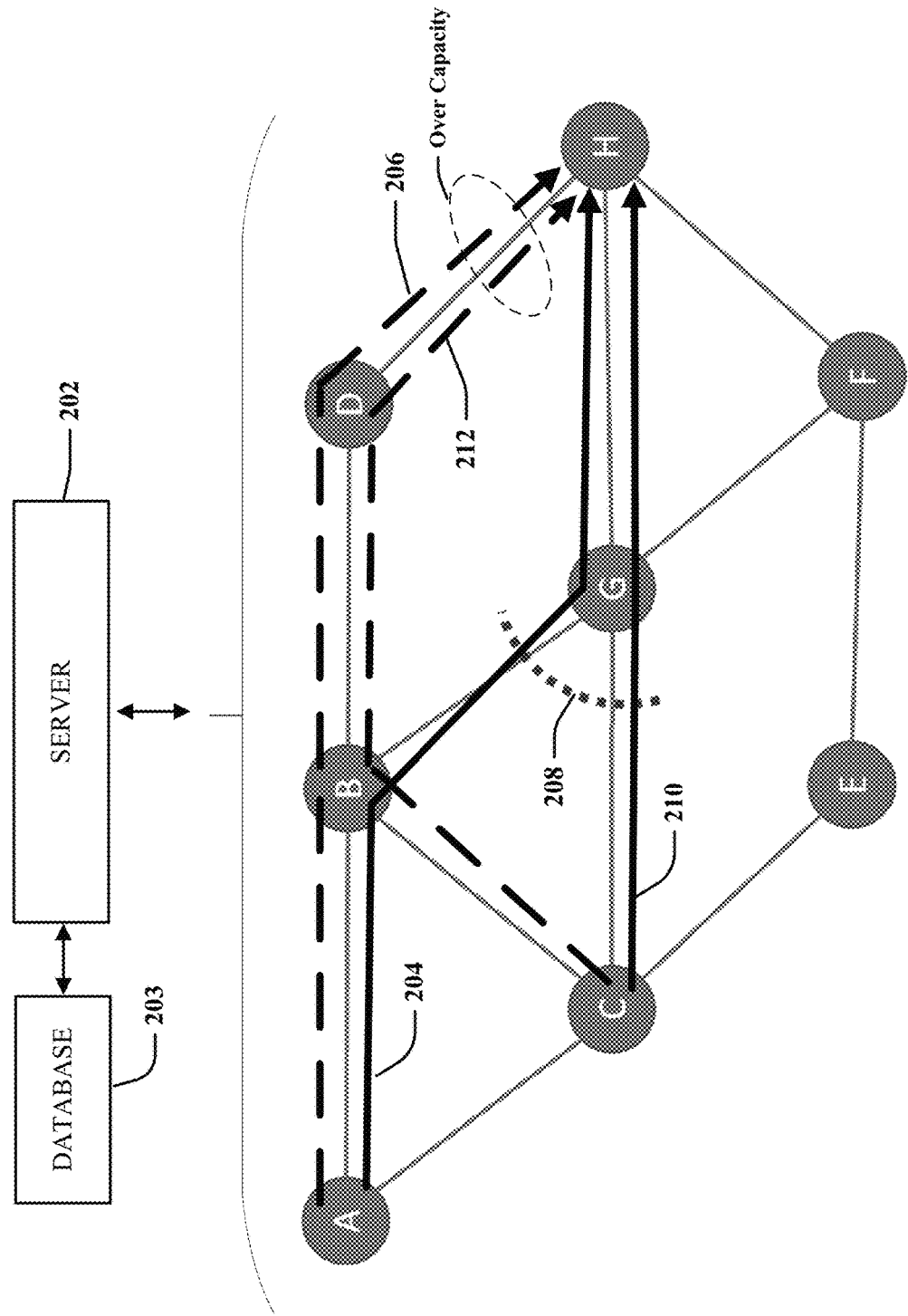
Figure 2D:
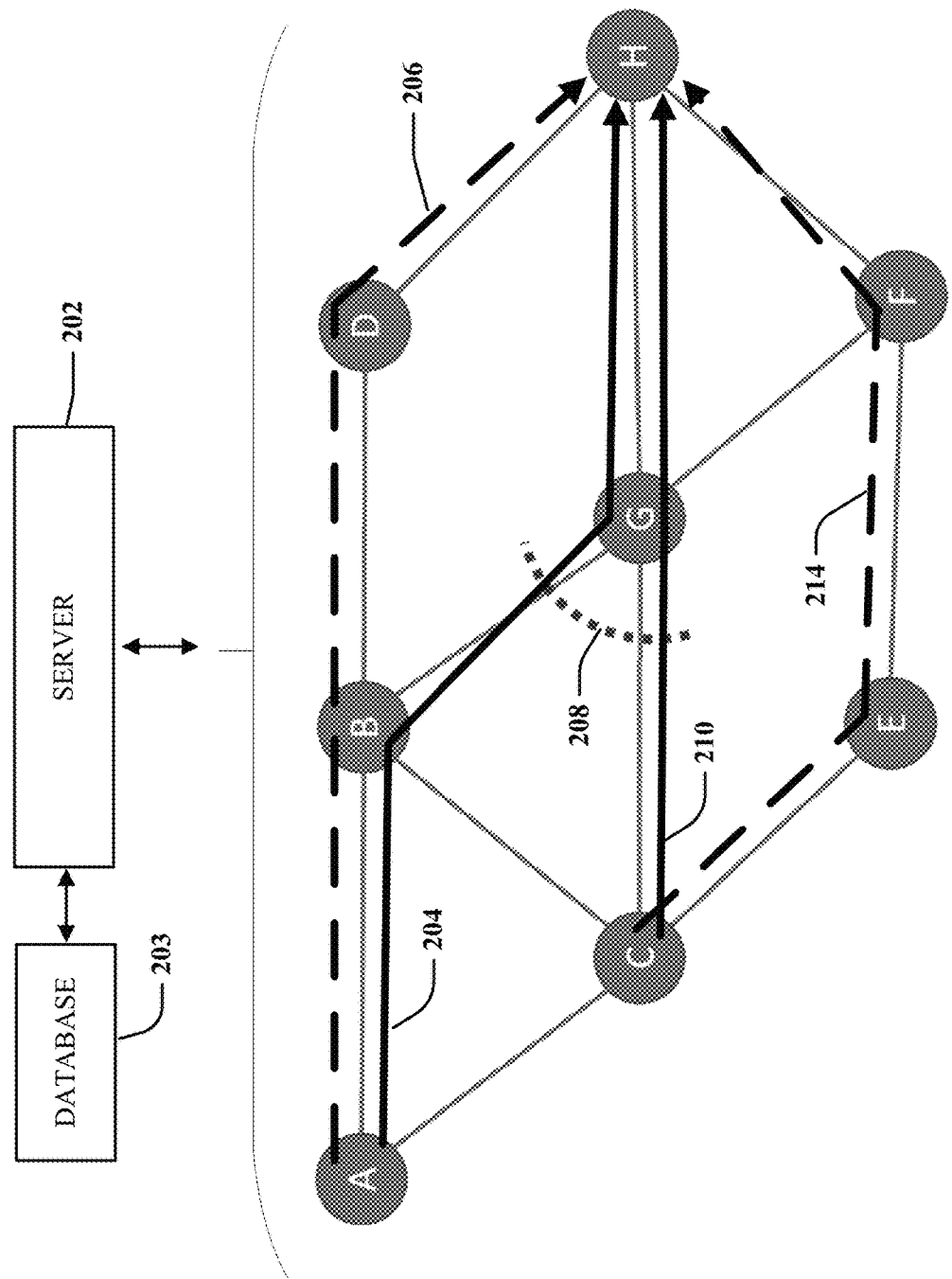

Referring now in particular to FIG. 2C, it is seen that in this example a second primary tunnel 210 exists between node C and node H (see the thick solid line on the path C-G-H). In addition, in this example, an FRR and/or bypass tunnel (or second alternate path) 212 is pre-computed between node C and node H (see the thick dashed line on the path C-B-D-H). This pre-computed second alternate path 212 is to be used in the event of a link failure (shown by curved dashed line 208) which, in this example, represents (as mentioned above) an SRLG failure that takes out 2 links (B-G and C-G). As seen in this figure, however, if the first alternate path 206 is already being used (that is, to carry traffic that is re-directed from first primary tunnel 204) an over capacity condition (see the dashed oval indicator between node D and node H) can arise if traffic is also re-directed from second primary tunnel 210 to the second alternate path 212. Accordingly, in various embodiments, traffic is not re-directed from second primary tunnel 210 to the second alternate path 212. Rather, a dynamic determination is made to find a different alternate path to carry traffic that is re-directed from the second primary tunnel 210. This different alternate path can be, for example, C-E, E-F, F-H (shown as dashed line 214 in FIG.¶2D). By using the different alternate path (rather than the second alternate path 212) to carry the re-directed traffic from the second primary tunnel 210, the over capacity condition mentioned above on link D-H can be eliminated (and traffic can be carried in a manner that satisfies one or more capacity constraints). In various examples, optimal dynamic FRR and/or bypass routes can be determined and utilized. In various examples, the over capacity condition can exist on one link between two nodes and/or on one or more sub-links of a link bundle between two nodes. In one example, the over capacity condition can exist on multiple links spanning three or more nodes. In another example, the over capacity condition can exist on multiple link bundles spanning three or more nodes. In another example, after a failure condition is corrected, traffic can be moved back to a respective primary tunnel. In another example, an over capacity condition can also be attributed to other traffic (not related to the first primary tunnel, the second primary tunnel, the first alternate path, the second alternate path, or the different alternate path).

Figure 2E:
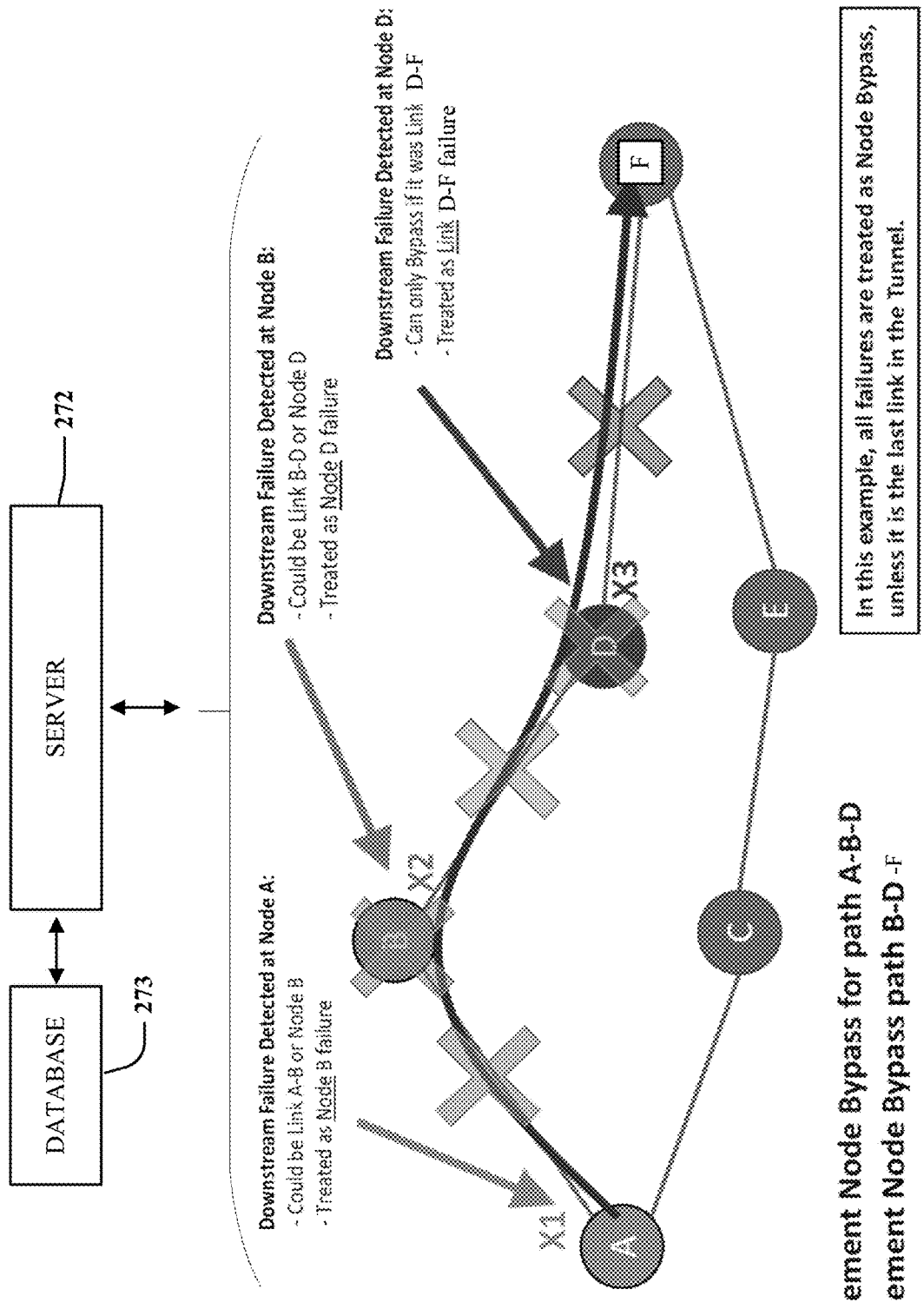
FIG. 2E is a block diagram illustrating an example, non-limiting embodiment of a system (that can function fully or partially within the communication network of FIG. 1) in accordance with various aspects described herein.

Referring now to FIG. 2E, this is a block diagram illustrating an example, non-limiting embodiment of a system 270 (that can function fully or partially within the communication network of FIG. 1) in accordance with various aspects described herein. As seen in this figure, server 272 is in bi-directional communication with a network of nodes A, B, C, D, E, F. In one example, server 272 is in bi-directional communication with each of nodes A, B, C, D, E, F. In another example, each of nodes A, B, C, D, E, F is in bi-directional communication with one or more of the other nodes via respective links (each of these links (A-B, B-D, D-F, A C, C-E, E-F) is shown as a solid line connecting two nodes). In another example, each link can comprise a group (or bundle) of links. The server 272 can operate as described herein to receive information from each of the nodes, to determine various paths to utilize, and/or to control each of the nodes to implement utilization of various paths. Further, server 272 is in bi-directional communication with database 273 (e.g., to retrieve therefrom one or more pre-computed paths for use as described herein). In one example, server 272 can determine (dynamically and in real-time (or near real-time)) optimal FRR and/or bypass routes. In another example, the server can comprise a plurality of servers.

Still referring to FIG. 2E, it is seen (with respect to Failure Detection: Link or Node Bypass) that for a downstream failure detected at node A, the failure can be link A-B or node B and that for the purposes of this discussion, the failure will be treated as a node B failure. Further, it is seen that for a downstream failure detected at node B, the failure can be link B-D or node D and that for the purposes of this discussion, the failure will be treated as a node D failure. Further still, it is seen that for a downstream failure detected at node D, a bypass will only be possible if the failure was link D-F and that for the purposes of this discussion, the failure will be treated as a link D-F failure. Thus, as seen, in this example, all failures are treated as Node Bypass, unless it is the last link in the Tunnel.

Figure 2F:
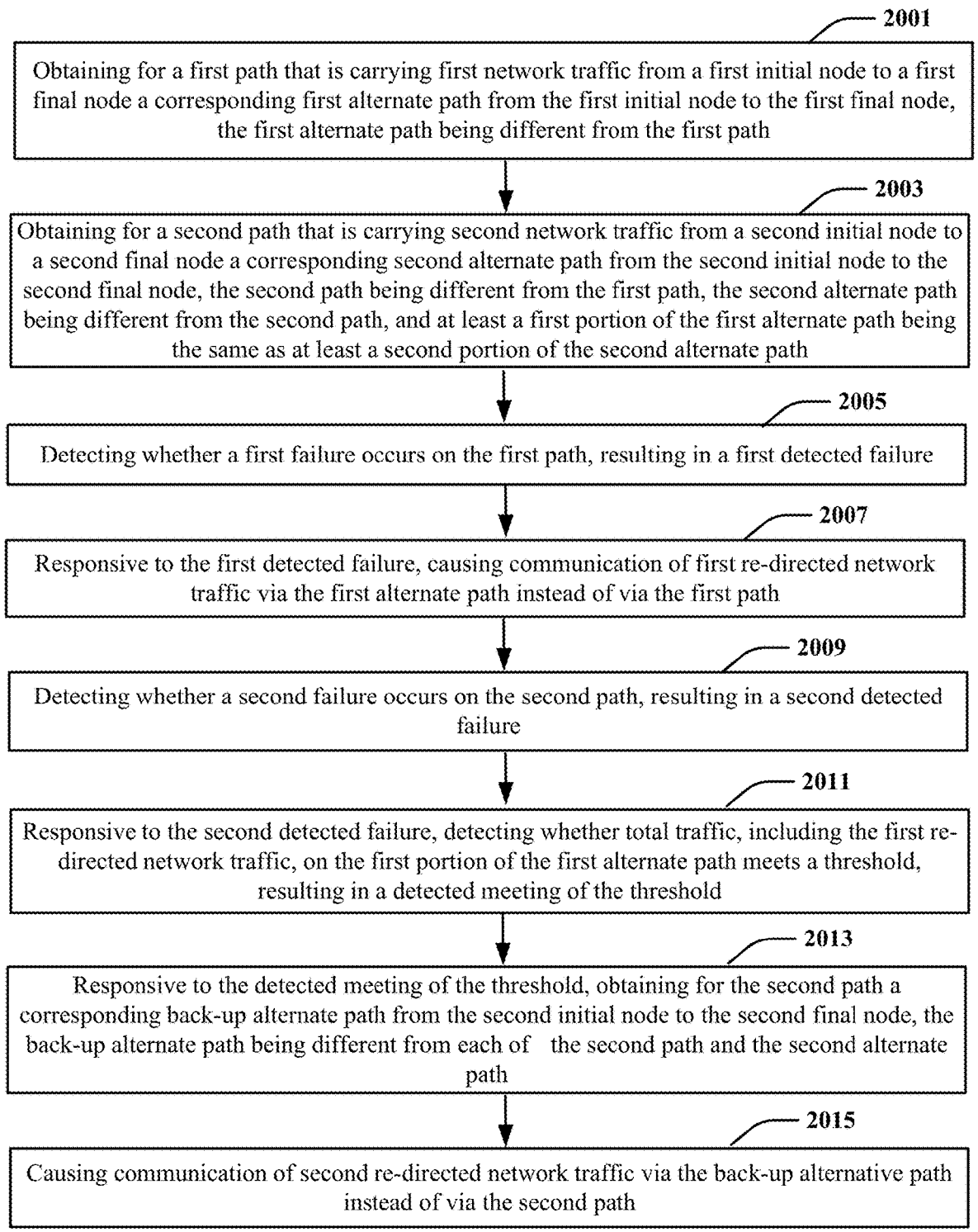
FIG. 2F depicts an illustrative embodiment of a method in accordance with various aspects described herein.

Referring now to FIG. 2F, various steps of a method 2000 according to an embodiment are shown. As seen in this FIG. 2F, step 2001 comprises obtaining for a first path that is carrying first network traffic from a first initial node to a first final node a corresponding first alternate path from the first initial node to the first final node, the first alternate path being different from the first path. Next, step 2003 comprises obtaining for a second path that is carrying second network traffic from a second initial node to a second final node a corresponding second alternate path from the second initial node to the second final node, the second path being different from the first path, the second alternate path being different from the second path, and at least a first portion of the first alternate path being the same as at least a second portion of the second alternate path. Next, step 2005 comprises detecting whether a first failure occurs on the first path, resulting in a first detected failure. Next, step 2007 comprises responsive to the first detected failure, causing communication of first re-directed network traffic via the first alternate path instead of via the first path. Next, step 2009 comprises detecting whether a second failure occurs on the second path, resulting in a second detected failure. Next, step 2011 comprises responsive to the second detected failure, detecting whether total traffic, including the first re directed network traffic, on the first portion of the first alternate path meets a threshold, resulting in a detected meeting of the threshold. Next, step 2013 comprises responsive to the detected meeting of the threshold, obtaining for the second path a corresponding back-up alternate path from the second initial node to the second final node, the back-up alternate path being different from each of the second path and the second alternate path. Next, step 2015 comprises causing communication of second re-directed network traffic via the back-up alternative path instead of via the second path.

In various examples: the first initial node comprises a first router; the second initial node comprises a second router; the first final node comprises a third router; and the second final node comprises a fourth router.

In various examples: the first path comprises one or more first optical communication links; the first alternate path comprises one or more first alternate optical communication links; the second path comprises one or more second optical communication links; the second alternate path comprises one or more second alternate optical communication links; and the back-up alternate path comprises one or more back-up alternate optical communication links.

In one example, the first re-directed network traffic comprises all of the first network traffic that would otherwise have been communicated via the first path.

In one example, the first re-directed network traffic comprises less than all of the first network traffic that would otherwise have been communicated via the first path.

In one example, the second re-directed network traffic comprises all of the second network traffic that would otherwise have been communicated via the second path.

In one example, the second re-directed network traffic comprises less than all of the second network traffic that would otherwise have been communicated via the second path.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2G:
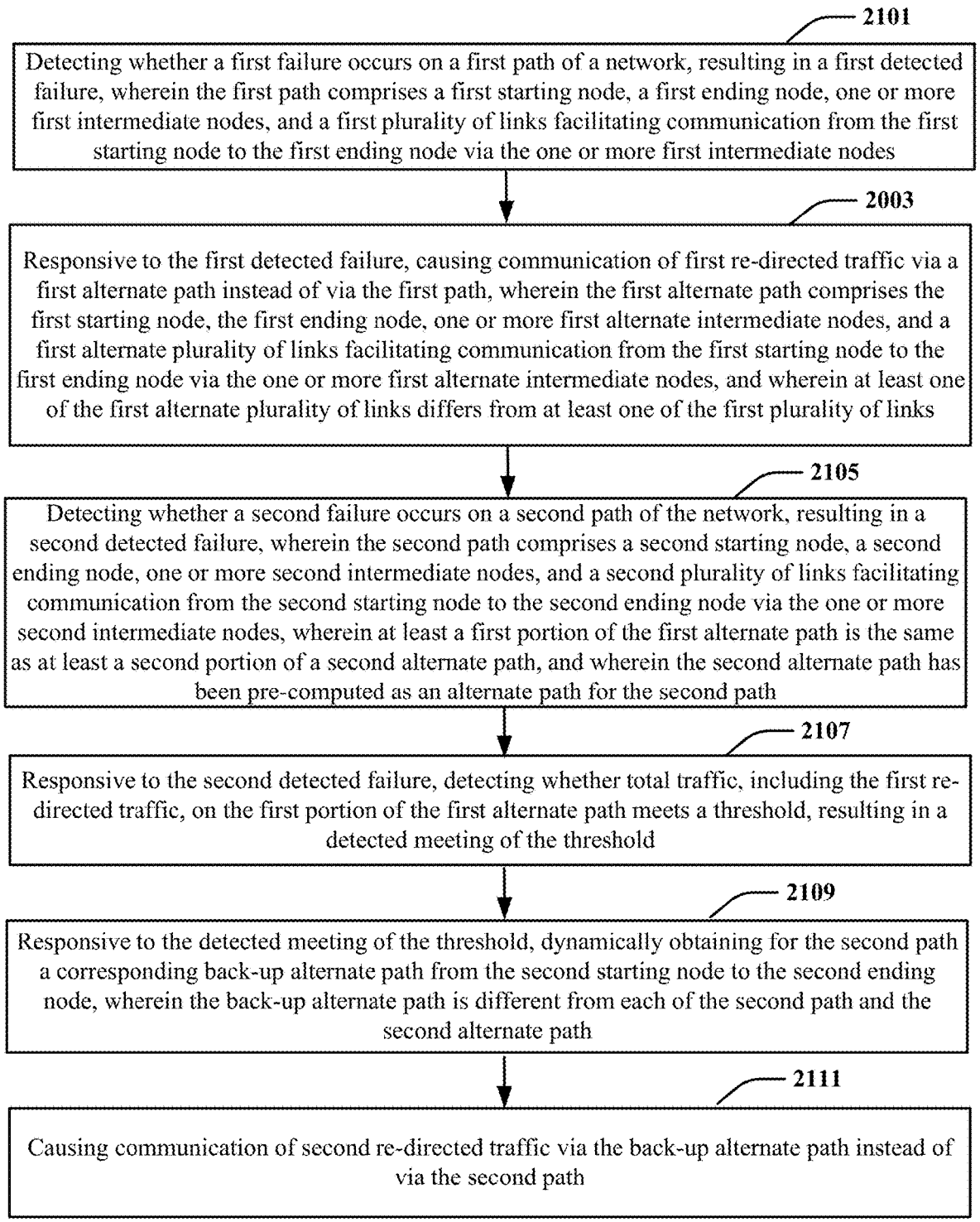
FIG. 2G depicts an illustrative embodiment of a method in accordance with various aspects described herein.

Referring now to FIG. 2G, various steps of a method 2100 according to an embodiment are shown. As seen in this FIG. 2G, step 2101 comprises detecting whether a first failure occurs on a first path of a network, resulting in a first detected failure, wherein the first path comprises a first starting node, a first ending node, one or more first intermediate nodes, and a first plurality of links facilitating communication from the first starting node to the first ending node via the one or more first intermediate nodes. Next, step 2103 comprises responsive to the first detected failure, causing communication of first re-directed traffic via a first alternate path instead of via the first path, wherein the first alternate path comprises the first starting node, the first ending node, one or more first alternate intermediate nodes, and a first alternate plurality of links facilitating communication from the first starting node to the first ending node via the one or more first alternate intermediate nodes, and wherein at least one of the first alternate plurality of links differs from at least one of the first plurality of links. Next, step 2105 comprises detecting whether a second failure occurs on a second path of the network, resulting in a second detected failure, wherein the second path comprises a second starting node, a second ending node, one or more second intermediate nodes, and a second plurality of links facilitating communication from the second starting node to the second ending node via the one or more second intermediate nodes, wherein at least a first portion of the first alternate path is the same as at least a second portion of a second alternate path, and wherein the second alternate path has been pre-computed as an alternate path for the second path. Next, step 2107 comprises responsive to the second detected failure, detecting whether total traffic, including the first re directed traffic, on the first portion of the first alternate path meets a threshold, resulting in a detected meeting of the threshold. Next, step 2109 comprises responsive to the detected meeting of the threshold, dynamically obtaining for the second path a corresponding back-up alternate path from the second starting node to the second ending node, wherein the back-up alternate path is different from each of the second path and the second alternate path. Next, step 2111 comprises causing communication of second re-directed traffic via the back-up alternate path instead of via the second path.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2H:
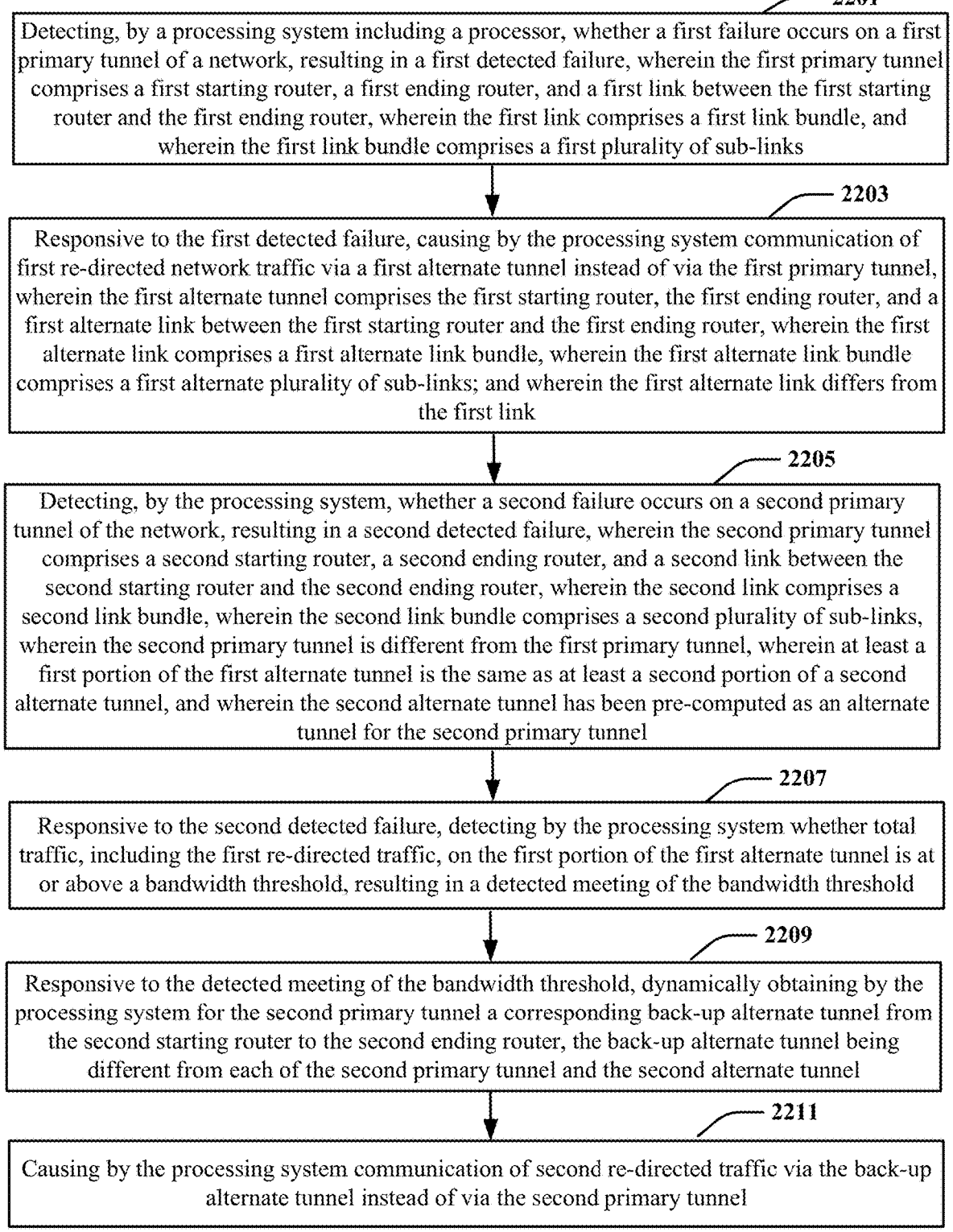
FIG. 2H depicts an illustrative embodiment of a method in accordance with various aspects described herein.

Referring now to FIG. 2H, various steps of a method 2200 according to an embodiment are shown. As seen in this FIG. 2H, step 2201 comprises detecting, by a processing system including a processor, whether a first failure occurs on a first primary tunnel of a network, resulting in a first detected failure, wherein the first primary tunnel comprises a first starting router, a first ending router, and a first link between the first starting router and the first ending router, wherein the first link comprises a first link bundle, and wherein the first link bundle comprises a first plurality of sub-links. Next, step 2203 comprises responsive to the first detected failure, causing by the processing system communication of first re-directed network traffic via a first alternate tunnel instead of via the first primary tunnel, wherein the first alternate tunnel comprises the first starting router, the first ending router, and a first alternate link between the first starting router and the first ending router, wherein the first alternate link comprises a first alternate link bundle, wherein the first alternate link bundle comprises a first alternate plurality of sub-links; and wherein the first alternate link differs from the first link. Next, step 2205 comprises detecting, by the processing system, whether a second failure occurs on a second primary tunnel of the network, resulting in a second detected failure, wherein the second primary tunnel comprises a second starting router, a second ending router, and a second link between the second starting router and the second ending router, wherein the second link comprises a second link bundle, wherein the second link bundle comprises a second plurality of sub-links, wherein the second primary tunnel is different from the first primary tunnel, wherein at least a first portion of the first alternate tunnel is the same as at least a second portion of a second alternate tunnel, and wherein the second alternate tunnel has been pre-computed as an alternate tunnel for the second primary tunnel. Next, step 2207 comprises responsive to the second detected failure, detecting by the processing system whether total traffic, including the first re-directed traffic, on the first portion of the first alternate tunnel is at or above a bandwidth threshold, resulting in a detected meeting of the bandwidth threshold. Next, step 2209 comprises responsive to the detected meeting of the bandwidth threshold, dynamically obtaining by the processing system for the second primary tunnel a corresponding back-up alternate tunnel from the second starting router to the second ending router, the back-up alternate tunnel being different from each of the second primary tunnel and the second alternate tunnel. Next, step 2211 comprises causing by the processing system communication of second re-directed traffic via the back-up alternate tunnel instead of via the second primary tunnel.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2I:
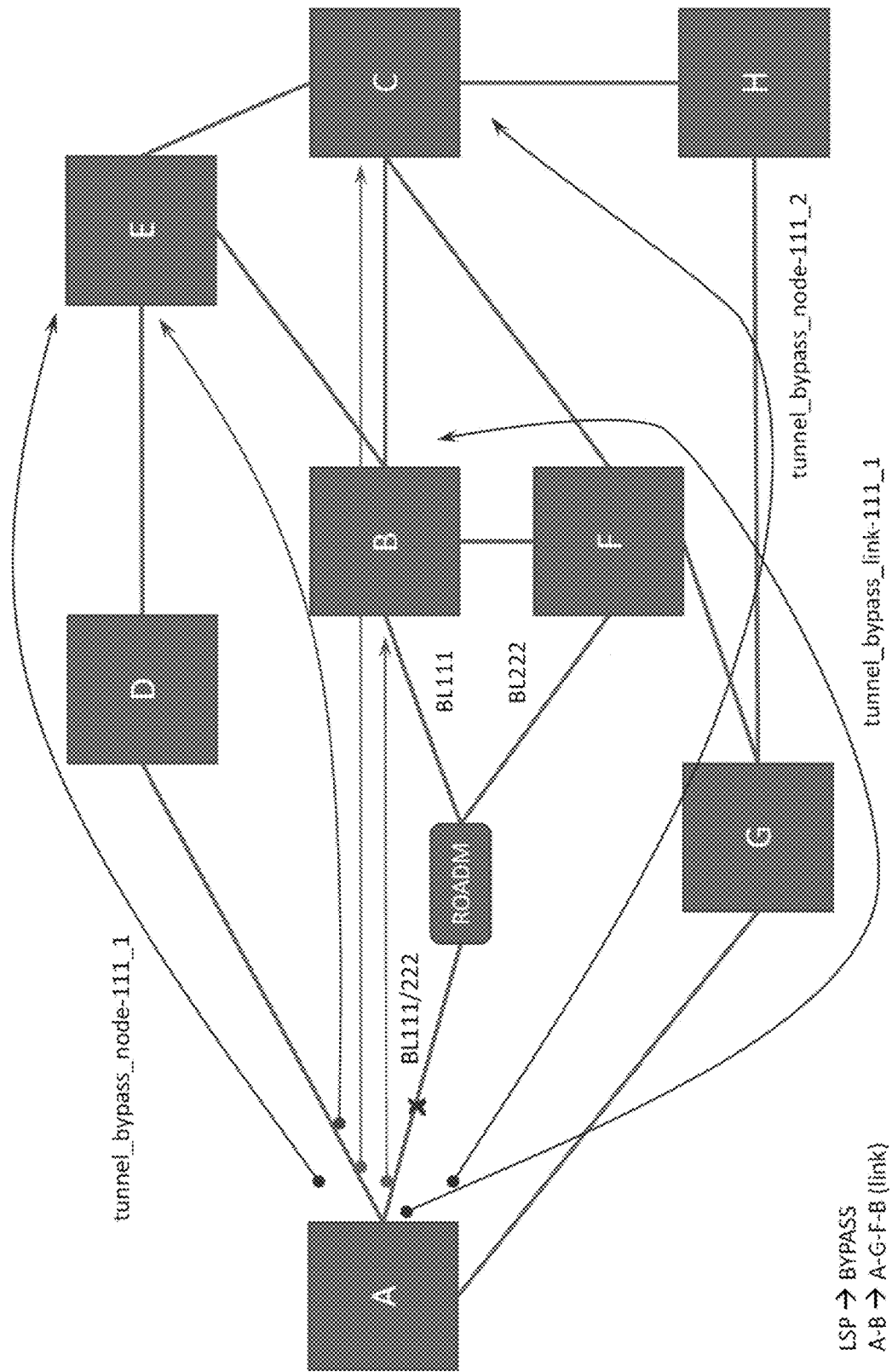
FIG. 2I is a block diagram illustrating an example, non-limiting embodiment of a system (that can function fully or partially within the communication network of FIG. 1) in accordance with various aspects described herein.

Reference will now be made to a method for recalculating Fast Re-route Link and Node Bypass Paths according to an embodiment. For the purposes of this discussion, the following definitions will apply:

For Each Link (l): (Note that Link is Used Here as a Shorthand for "Link Bundle")
    Source(l)=source node of link l
    Destination(l)=destination node of link l
    Capacity C(l)=max reserved BW (bandwidth) for the link (in one example, this is normally set to 95% of actual max capacity of link)
    No Failure Utilization Utilization(l)=Amount of traffic over this link under no failures
    Failure Utilization F(l, f)=Amount of traffic over this link l, under failure f (written as a single parameter here for simplicity). Failures include node failures, SRLG failures, link failures
    Worst Utilization W(l)=Amount of traffic over this link under the worst failure scenario
    That is, Max over f of F(l, f)
    SRLG(l)=list of SRLG's that link l is a member of
For Each Tunnel (t):
    LT(t, i)=Links in Tunnel t (i=1, 2, . . . , N(t), where N(t)=# of links in the tunnel t)
    U(t)=Utilization of Tunnel t, or amount of traffic over tunnel
    B(t, i, j)=Bypass tunnel for Tunnel t under failure detected at link L(t, i), (j=1, 2, . . . , M(t)=# of links in Bypass tunnel). (Actual failure could be due to link or the node at the other end . . . )
        There could be restrictions on the number of different bypass tunnels, so normally, many bypass paths are reused. For example, bypass tunnels bypassing a specific failed link may follow the same path. Or bypass tunnels bypassing a specific failed node and with the same source and destination node may follow the same path.
    Could also include other characteristics of Tunnel like priority of traffic (priority vs. default) (see "Updating Method for Priority vs. Default Traffic" below)
Failure States:
For Each SRLG (s):
    LS(s, i)=Links in SRLG s (i=1, 2, . . . , S(s)=# of links in SRLG s).
        These represent all the links that could simultaneously fail due to the Shared fail state
For Each Node (n):
    LN(n, i)=Links adjacent to node n (i=1, 2, . . . , Nodes (n)=degree of node n=# links adjacent to n
        These represent all the links that could simultaneously fail due to node n failing Still referring to the method for recalculating Fast Re-route Link and Node Bypass Paths according to an embodiment, for the purposes of this discussion, the following calculations can be performed:

Initial Calculations:
Depending on goal, obtain tunnel utilizations by:
    Reading in current state of the network
    Using historical busy hour state of the network (e.g., previous day/week)
    Forecasting future state of the network using extrapolation and/or machine learning
If needed, Prune SRLG set to dominant SRLG's.
Use current Bypass Paths (B(t, i, j)). If there are none, calculate initial Bypass paths:
Initial Bypass Paths (if Needed):
    For each link LT(t, i) in Tunnel t:
        If it is the last link (i.e., I=N(t))
            Remove all links in the same SRLG(LT(t, i))
            Find the shortest path from Source(LT(t, i)) to Destination(LT(t, i))
                Routing around the failed link, avoiding any in common SRLG
            Use this path as initial Bypass Path B(t, I, *)
        If not the last link Remove all links in the same SRLG(LT(t, i))=LS(SRLG(LT(t, i)))
Remove all links adjacent to the Destination node=LN(Destination(LT(t, i)))
Find the shortest path from Source(LT(t, i)) to Destination(LT(t, i+1))
Routing around possibly failed node, also avoiding links in common SRLG
Use this path as initial Bypass Path B(t, I, *)
Calculate Initial Utilizations at Link l:
Utilization(l)=Sum across all Tunnels t, U(t) where l is in LT(t, *)
F(l, f). For each failure f:
Initialize each F(l, f)=0 for all links l
For each tunnel t:
If any link in LT(t, *) is in f, let i be the first such link
If l in in B(t, i, *), add U(t) to F(l, f) (i.e., F(l, f)+=U(t))
If no link in LT(t, *) is in f
If l is in LT(t, *), add U(t) to F(l, f)
W(l)=Max over f of F(l, f)
Still referring to the method for recalculating Fast Reroute Link and Node Bypass Paths according to an embodiment, for the purposes of this discussion, the following optimizing can be performed:
Optimizing Bypass Paths:
Objective is to make sure the Worst-case utilization across any failure is under the capacity for that link:
i.e., W(l)<=C(l) for all links l.
Objective: Minimize Sum across l of $[W(l)-C(l)]^+$
If this is not the case, recalculate the Bypass Paths to achieve this, if possible.
Sort links with W(l) >C(l) in decreasing order of [W(l)-C(l)]
Repeat this loop until there are no links left on list:
Take worst link in this list (L), where W(L) >C(L)
Let F=the worst failure that causes this utilization (i.e., W(L)=F(L, F))
For each Bypass Path B(t, I, *) triggered by this failure F, if link L is in this path:
Look for a better Bypass path:
For each failure f that triggers this Bypass path B(t, I, *):
Calculate F(l, f) for each link l as if the Bypass Path B(t, I, *) went over link l (i.e., included U(t) traffic). [1]
Let W(l)=Max over this subset of failures f of F(l, f)
For each link l:
If W(l)<=C(l), set weight to be its length
Otherwise, set weight to be its length+Big-Const*[W(l) -C(l)]
Using these new weights, find the new Bypass Path using shortest path, as in the above Initial Bypass Paths Calculations (see notes, "1", "2" immediately below)
1. If we are considering partial link failures of a SRLG, instead of removing partially failed links, increase F(l, f) by the loss in bandwidth of that link due to the SRLG failure.
2 Then when using shortest path to calculate the new Bypass Paths, remove only those links that are completely failed.
If this results in an improvement in Objective, reassign Bypass Path to be this path.
If there is no change in W(L), remove this link from the list and continue the loop.
Otherwise, order the links (not removed) in decreasing order of [W(l)-C(l)], and continue the loop
Recalculate the objective given these new Bypass paths. Identify any capacity violations (i.e., W(l) >C(l)) for potential link augment.
Depending on the goals, update the Bypass Paths of tunnels if the difference is greater than some threshold (or if these are initial calculations). A higher threshold results in less frequent changes.
Still referring to the method for recalculating Fast Reroute Link and Node Bypass Paths according to an embodiment, for the purposes of this discussion, the following updating can be performed:
Updating Method for Priority vs. Default Traffic:
Changes when considering Priority vs. Default traffic, two sets of utilizations are calculated separately for each tunnel and link:
P-U(t)=Priority utilization on tunnel t, or amount of priority traffic over tunnel
D-U(t)=Default utilization on tunnel t, or amount of default traffic over tunnel
P-Utilization(l)=Amount of Priority traffic over this link under no failures
=Sum across all Tunnels t, P-U(t) where l is in LT(t, *)
D-Utilization(l)=Amount of Default traffic over this link under no failures
=Sum across all Tunnels t, D-U(t) where l is in LT(t, *)
P-F(l, f)=Amount of Priority traffic over this link l, under failure f
When considering Partial link SRLG failure: For partially failed links, apply the increase to the Priority traffic (P-F(l, f)), not Default traffic.
D-F(l, f)=Amount of Default traffic over this link l, under failure f
Let PCF=Priority Capacity Fraction=fraction of capacity allocated to priority traffic
Calculate Combined-F(l, f)=P-F(l, f)+D-F(l, f)+Big-Const*$[P-F(l, f)-PCF*C(l)]^+$
Combined-W(l)=Max over f of Combined-F(l, f)
Now the objective is to make sure priority traffic does not exceed the PCF * capacity of the link, and then to make sure total traffic does not exceed the capacity of the link.
Objective: Minimize Sum across l of $[Combined-W(l)-C(l)]^+$
Reference will now be made to "Link and Node Bypass" according to an embodiment. More particularly, in this embodiment, the "Bypass Mesh Rules" can comprise the following:
Tunnels whose tail is on the failed link will use link protection
Tunnels that transit the failed link will use node protection (next-next hop bypass)
Multiple next-next hop tunnels may be created to handle multiple destination nodes
In the following example (shown in FIG. 2I) there are 3 bypass tunnels created to protect LSPs ("Labelled Switched Paths") on BL111
tunnel_bypass_node-111_1
tunnel_bypass_node-111_2
tunnel_bypass_link-111_1
Referring now to FIG. 2I, this is a block diagram illustrating an example, non-limiting embodiment of a system 2300 (that can function fully or partially within the communication network of FIG. 1) in accordance with various aspects described herein. As seen, in this bypass mesh example, there are three bypass tunnels created—tunnel_bypass_node-111_1; tunnel_bypass_node-111_2; tunnel_bypass_link-111_1. Further, as seen, in this example: LSP ("Labelled Switched Paths") A-B uses bypass A-G-F-B (link); LSP ("Labelled Switched Paths") A-B-C uses bypass A-G-H-C(node); and LSP ("Labelled Switched Paths") A-B-E uses bypass A-D-E (node).

As described herein, various embodiments can provide for fast traffic recovery under link and/or router failure.

As described herein, various embodiments can provide (e.g., in the short-term) for avoiding congestion and packet loss (leading to better customer experience) by computing better bypass paths for the current network conditions.

As described herein, various embodiments can provide (e.g., in the long-term) for capital savings as these optimal bypass paths are able to utilize existing capacity more efficiently (e.g., rather than relying on increasing link capacity).

As described herein, conventionally determined FRR paths are generally static, generally calculated infrequently by the routers, and generally do not consider traffic changes or traffic from other FRR paths impacted by common SRLG's. In contrast, various embodiments provide for FRR paths that are dynamic, that are calculated frequently (e.g., in real-time or near real-time) by a centralized mechanism, and that consider traffic changes and/or traffic from other FRR path(s) impacted by common SRLG's.

As described herein, various embodiments can provide for a centralized controller that computes globally optimal FRR and/or bypass paths dynamically. By considering network conditions in real-time, various embodiments can avoid congestion, packet loss, and overbuilding capacity. The centralized system in the SDN controller can compute optimal bypass and/or FRR tunnels as follows: (i) For each SRLG, identify potential link bundle congestions using the FRR paths for the failures in that SRLG, recording the "high-water" mark and the corresponding SRLG for each link bundle; (ii) Sort the congested link bundles by severity (where congestion due to priority traffic is given precedence over default traffic); (iii) Starting with the worst congested link bundle and corresponding SRLG, identify the list of FRR paths (A) that route over that link bundle; (iv) Keeping all other FRR paths constant, find the FRR path change (from the FRR paths list A) that minimizes the link bundle congestions ("high-water" mark) for the failures across each SRLG; and (v) If there is a change, update this FRR path, recalculate the "high-water" marks and resort the congested link bundles list. If there is no change, remove this link bundle from the list. Repeat this loop with the next worst congested link bundle in list until no links remain in list.

As described herein, various embodiments can provide for multiple alternate path options—for example, choose the best option (such as an option with no existing traffic or minimal existing traffic).

As described herein, various embodiments can provide for accurately computing how much traffic is where as a function of time of day, day, date, etc.

As described herein, various embodiments can provide for a centralized system that is used to make a centralized determination and to update path(s) dynamically (such as to take into account the real-time state of the network).

As described herein, various embodiments can provide for operation in the context of thousands or 10s of thousands of tunnels.

As described herein, various embodiments can provide for path selection based upon, for example, the busy hour of the previous day for a given path. For instance, look at how busy a particular path could get and then try to avoid having the amount of traffic on that path exceeding the capacity of any link.

As described herein, various embodiments can provide for path selection based upon, for example, forecast of a future state using extrapolation and/or machine learning. For instance, the loads on a given path can are expected to be X in the next hour, so use that forecast state to calculate a tunnel.

As described herein, various embodiments can provide for path selection based upon, for example, one or more default paths.

As described herein, various embodiments can provide for operation in the context of shared group of links that share the same risk.

As described herein, various embodiments can provide for pruning of an SRLG.

As described herein, various embodiments can provide for separating the SRLG failures from the node.

As described herein, various embodiments can provide for routing around areas where there will be high utilization.

As described herein, various embodiments can provide for priority traffic (such as to give certain traffic priority over other traffic (e.g., over default traffic).

As described herein, various embodiments can provide for proportional priority (such as weightage or proportion of priority and calculation of different paths for priority).

As described herein, various embodiments can provide for use of one or more thresholds (e.g., use a bypass tunnel if a difference is greater than some threshold). This can help avoid changing paths too frequently.

As described herein, various embodiments can take into account not just immediate traffic utilization but can also (or instead) utilize historic traffic information (e.g., the last 24 hours).

As described herein, various embodiments can (when making path determinations) take into account the current state of the network and/or what are the currently used paths. In various examples, the busy hour(s)/day(s)/week(s) can be taken into account. In various examples, forecasting can be utilized (for instance, forecast the expected traffic in one hour from now, and use the forecast to calculate the fastest re-route or bypass path based on that future state). In various examples, different factors such as priority and partial failure can be taken into account.

As described herein, various embodiments can calculate paths within a few seconds.

As described herein, various embodiments can (when making path determinations) take into account the current, historical, and/or future traffic in a centralized algorithm.

As described herein, various embodiments can (when making path determinations) take into account collected network statistics.

As described herein, various embodiments can (when making path determinations) make sure that an alternative path does not fail. For instance, make sure that too much traffic is not placed on an alternative path.

As described herein, various embodiments can provide for dynamically calculating routes.

As described herein, various embodiments can provide for augmenting a link (e.g., with more capacity) if a given failure will otherwise cause a link to exceed capacity.

As described herein, various embodiments can provide for certain traffic to receive priority.

As described herein, various embodiments can provide for updating one or more paths only of a certain threshold is met.

As described herein, various embodiments can provide for centralized dynamic path determination based on a current and/or future view of a network.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, some or all of the subsystems and functions of system 200, some or all of the subsystems and functions of system 270, some or all of method 2000, some or all of method 2100, some or all of method 2200, some or all of the subsystems and functions of system 2300, and/or some or all of the subsystems and functions of system 2400. For example, virtualized communication network 300 can facilitate in whole or in part dynamic re-routing of network traffic depending upon total traffic flow on a path from one network node to another network node (in various specific examples, the dynamic re routing can be in real-time or near real-time).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
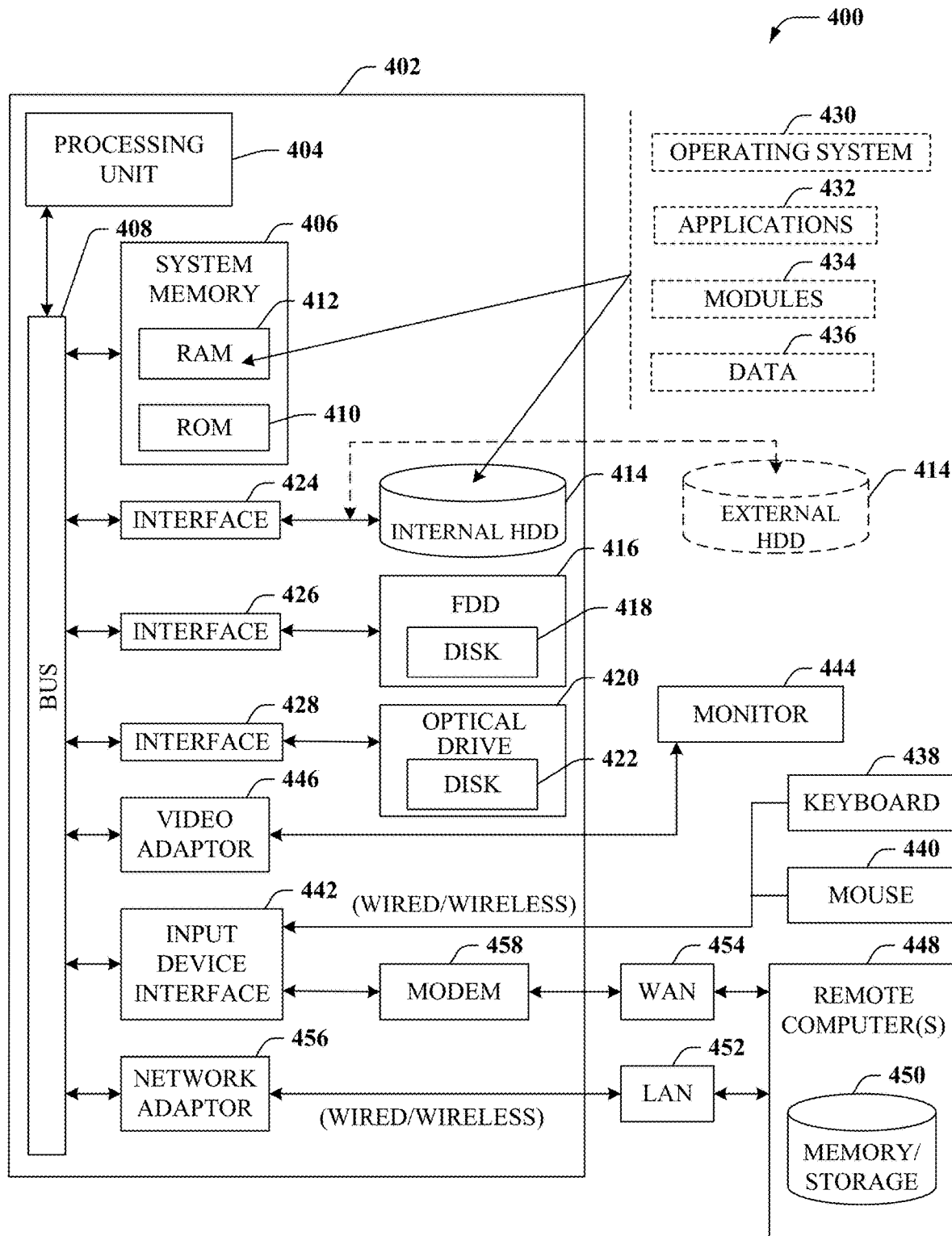
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part dynamic re-routing of network traffic depending upon total traffic flow on a path from one network node to another network node (in various specific examples, the dynamic re-routing can be in real-time or near real-time).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
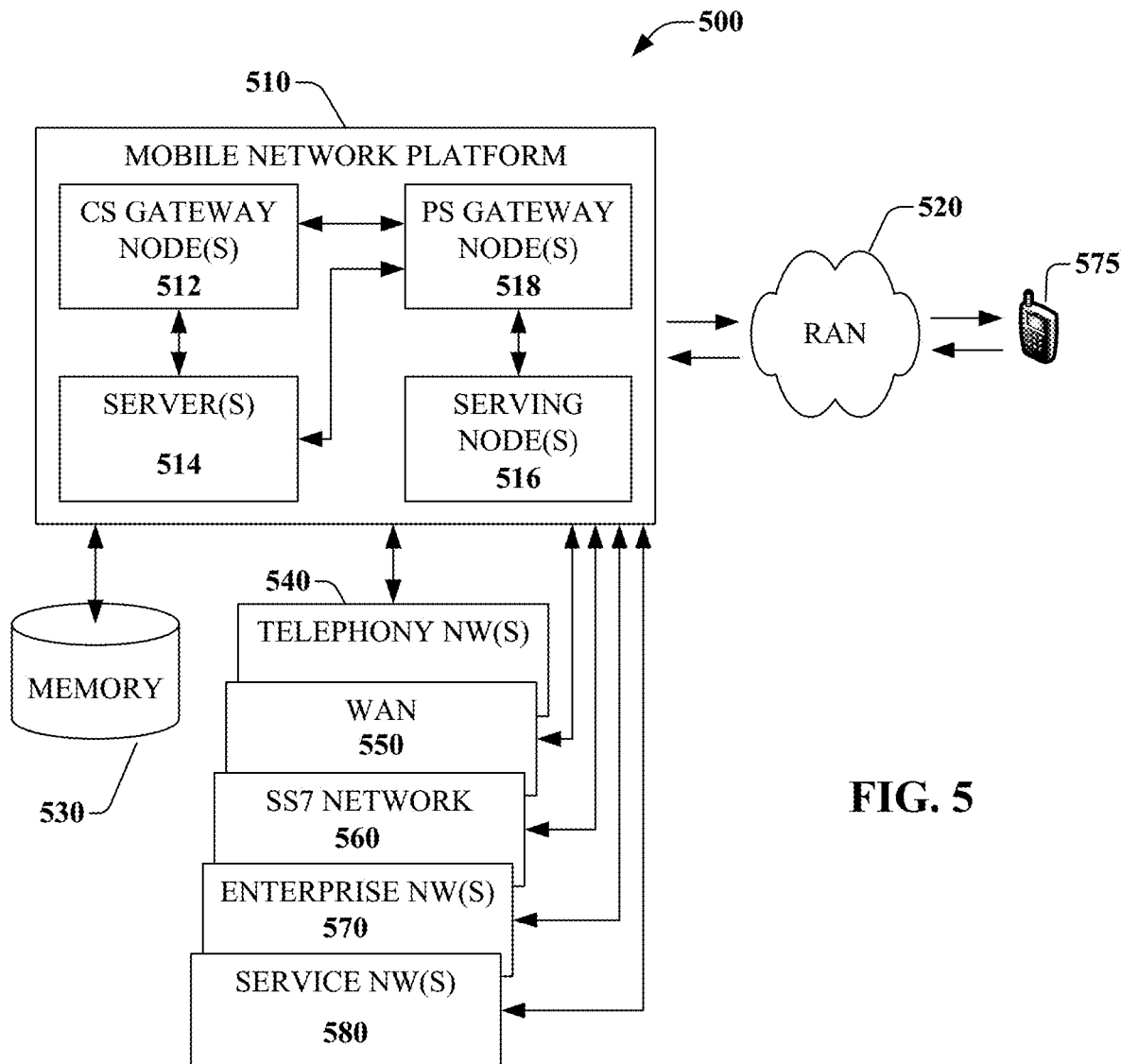
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part dynamic re-routing of network traffic depending upon total traffic flow on a path from one network node to another network node (in various specific examples, the dynamic re-routing can be in real-time or near real-time). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
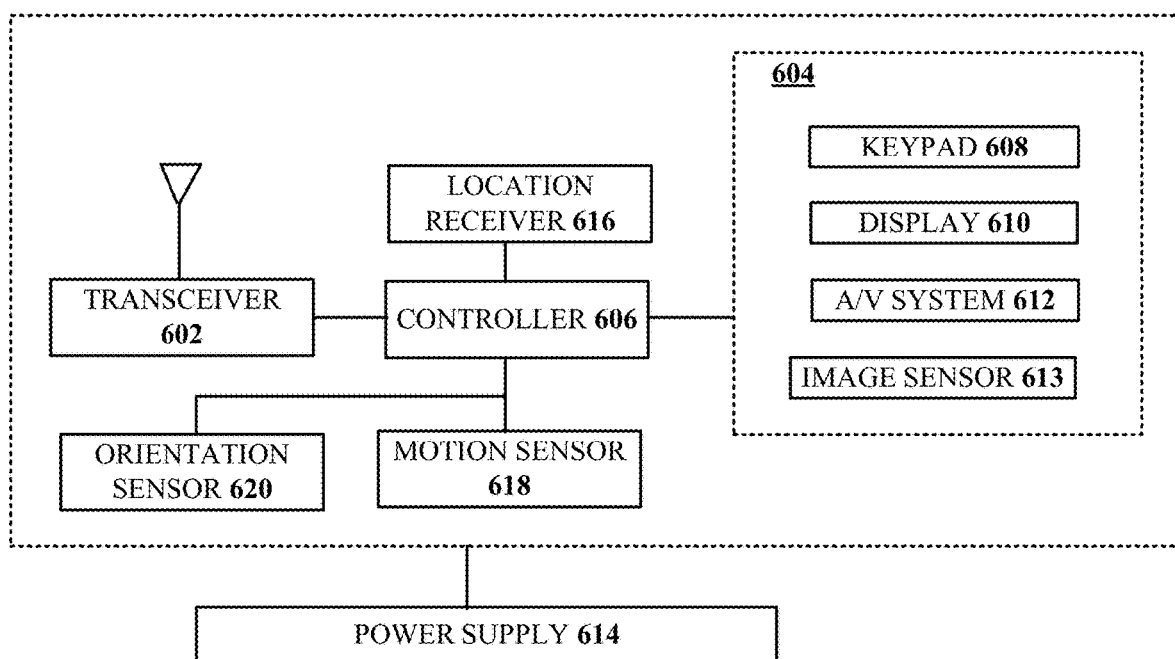
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part dynamic re-routing of network traffic depending upon total traffic flow on a path from one network node to another network node (in various specific examples, the dynamic re-routing can be in real-time or near real-time).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatic dynamic re-routing of network traffic depending upon total traffic flow on a path from one network node to another network node) can employ various AI-based schemes for carrying out various embodiments thereof. Moreover, a classifier can be employed to determine a ranking or priority of each node of the network, each link of the network, and/or each traffic flow in the network. A classifier is a function that maps an input attribute vector, x=(x1, x2, x3, x4, . . . , xn), to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the node(s) and/or link(s) and/or traffic flows should be utilized for particular network traffic.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
   a processing system including a processor; and
   a memory that stores executable instructions that, when executed by the processing system, facilitate performance of operations, the operations comprising:
   obtaining for a first path that is carrying first network traffic from a first initial node to a first final node a corresponding first alternate path from the first initial node to the first final node, the first alternate path being different from the first path;
   obtaining for a second path that is carrying second network traffic from a second initial node to a second final node a corresponding second alternate path from the second initial node to the second final node, the second path being different from the first path, the second alternate path being different from the second path, and at least a first portion of the first alternate path being the same as at least a second portion of the second alternate path;

detecting whether a first failure occurs on the first path, resulting in a first detected failure;

responsive to the first detected failure, causing communication of first re-directed network traffic via the first alternate path instead of via the first path;

detecting whether a second failure occurs on the second path, resulting in a second detected failure;

responsive to the second detected failure, detecting whether total traffic, including the first re-directed network traffic, on the first portion of the first alternate path meets a threshold, resulting in a detected meeting of the threshold, wherein the total traffic on the first portion of the first alternate path comprises other traffic in addition to the first re-directed network traffic;

responsive to the detected meeting of the threshold, obtaining for the second path a corresponding back-up alternate path from the second initial node to the second final node, the back-up alternate path being different from each of the second path and the second alternate path; and causing communication of second re-directed network traffic via the back-up alternate path instead of via the second path.

2. The device of claim 1, wherein:
the device comprises a centralized system;
the centralized system comprises a database;
the database comprises a plurality of stored paths including the first alternate path and the second alternate path;
the obtaining the first alternate path comprises obtaining the first alternate path from the database; and
the obtaining the second alternate path comprises obtaining the second alternate path from the database.

3. The device of claim 2, wherein:
the detecting whether the first failure occurs on the first path is based at least in part upon first information provided to the device from the first initial node, the first final node, or any combination thereof;
the causing of the communication of the first re-directed network traffic via the first alternate path instead of via the first path is facilitated by transmitting of one or more first commands to the first initial node, the first final node, one or more first other nodes that are between the first initial node and the first final node, or any combination thereof;
the detecting whether the second failure occurs on the second path is based at least in part upon second information provided to the device from the second initial node, the second final node, or any combination thereof;
the detecting whether the total traffic, including the first re-directed network traffic, on the first portion of the first alternate path meets the threshold is based at least in part upon third information provided to the device from the first initial node, the first final node, one or more first alternate nodes that are between the first initial node and the first final node, or any combination thereof;

the obtaining for the second path the back-up alternate path from the second initial node to the second final node is performed dynamically in real-time by the device; and the causing of the communication of the second re-directed network traffic via the back up alternate path instead of via the second path is facilitated by transmitting of one or more second commands to the second initial node, the second final node, one or more second back-up alternate nodes that are between the second initial node and the second final node, or any combination thereof.

4. The device of claim 3, wherein the obtaining for the second path the back-up alternate path from the second initial node to the second final node comprises calculating the back-up alternate path dynamically in real-time by the device.

5. The device of claim 3, wherein the obtaining for the second path the back-up alternate path from the second initial node to the second final node comprises retrieving the back-up alternate path dynamically in real-time from the database.

6. The device of claim 1, wherein:
the first path comprises a first link between the first initial node and the first final node;
the first failure comprises failure of the first link between the first initial node and the first final node;
the second path comprises a second link between the second initial node and the second final node; and
the second failure comprises failure of the second link between the second initial node and the second final node.

7. The device of claim 6, wherein:
the first failure comprises a first total failure of the first link between the first initial node and the first final node; and
the second failure comprises a second total failure of the second link between the second initial node and the second final node.

8. The device of claim 6, wherein:
the first link between the first initial node and the first final node comprises a first link bundle;
the first link bundle comprises a plurality of first sub-links;
the first failure comprises a partial failure of the first link between the first initial node and the first final node;
the partial failure of the first link between the first initial node and the first final node comprises one or more of the first sub-links failing while one or more other ones of the first sub-links remain functioning;
the second link between the second initial node and the second final node comprises a second link bundle;
the second link bundle comprises a plurality of second sub-links;
the second failure comprises a partial failure of the second link between the second initial node and the second final node; and
the partial failure of the second link between the second initial node and the second final node comprises one or more of the second sub-links failing while one or more other ones of the second sub-links remain functioning.

9. The device of claim 1, wherein:
the first path comprises one or more first intermediate nodes between the first initial node and the first final node;

the first path comprises a plurality of first links forming the first path between the first initial node and the first final node by traversing the one or more first intermediate nodes;

the first failure comprises failure of at least one of the one or more first intermediate nodes, failure of at least one of the plurality of first links, or any combination thereof;

the second path comprises one or more second intermediate nodes between the second initial node and the second final node;

the second path comprises a plurality of second links forming the second path between the second initial node and the second final node by traversing the one or more second intermediate nodes; and the second failure comprises failure of at least one of the one or more second intermediate nodes, failure of at least one of the plurality of second links, or any combination thereof.

10. The device of claim 1, wherein the threshold comprises a bandwidth threshold.

11. A non-transitory machine-readable medium comprising executable instructions that, when executed by a processing system including a processor, facilitate performance of operations, the operations comprising:

detecting whether a first failure occurs on a first path of a network, resulting in a first detected failure, wherein the first path comprises a first starting node, a first ending node, one or more first intermediate nodes, and a first plurality of links facilitating communication from the first starting node to the first ending node via the one or more first intermediate nodes;

responsive to the first detected failure, causing communication of first re-directed traffic via a first alternate path instead of via the first path, wherein the first alternate path comprises the first starting node, the first ending node, one or more first alternate intermediate nodes, and a first alternate plurality of links facilitating communication from the first starting node to the first ending node via the one or more first alternate intermediate nodes, and wherein at least one of the first alternate plurality of links differs from at least one of the first plurality of links;

detecting whether a second failure occurs on a second path of the network, resulting in a second detected failure, wherein the second path comprises a second starting node, a second ending node, one or more second intermediate nodes, and a second plurality of links facilitating communication from the second starting node to the second ending node via the one or more second intermediate nodes, wherein at least a first portion of the first alternate path is the same as at least a second portion of a second alternate path, and wherein the second alternate path has been pre-computed as an alternate path for the second path, wherein each of the first starting node, the second starting node, the one or more first intermediate nodes, the one or more second intermediate nodes, the first ending node, and the second ending node comprises a respective router;

responsive to the second detected failure, detecting whether total traffic, including the first re-directed traffic, on the first portion of the first alternate path meets a threshold, resulting in a detected meeting of the threshold;

responsive to the detected meeting of the threshold, dynamically obtaining for the second path a corresponding back-up alternate path from the second starting node to the second ending node, wherein the back-up alternate path is different from each of the second path and the second alternate path; and causing communication of second re-directed traffic via the back-up alternate path instead of via the second path.

12. The non-transitory machine-readable medium of claim 11, wherein the first starting node is the same as the second starting node.

13. The non-transitory machine-readable medium of claim 11, wherein the first ending node is the same as the second ending node.

14. The non-transitory machine-readable medium of claim 11, wherein:

each of the first plurality of links comprises a respective optical link; and each of the second plurality of links comprises a respective optical link.

15. The non-transitory machine-readable medium of claim 11, wherein:

the detecting whether the first failure occurs on the first path is based at least in part upon first information from the first starting node, the first ending node, or any combination thereof.

16. The non-transitory machine-readable medium of claim 11, wherein:

the causing of the communication of the first re-directed traffic via the first alternate path instead of via the first path is facilitated by transmitting of one or more first commands to the first starting node, the first ending node, or any combination thereof.

17. The non-transitory machine-readable medium of claim 16, wherein:

the causing of the communication of the second re-directed traffic via the back-up alternate path instead of via the second path is facilitated by transmitting of one or more second commands to the second starting node, the second ending node, or any combination thereof.

18. A method comprising:

detecting, by a processing system including a processor, whether a first failure occurs on a first primary tunnel of a network, resulting in a first detected failure, wherein the first primary tunnel comprises a first starting router, a first ending router, and a first link between the first starting router and the first ending router, wherein the first link comprises a first link bundle, and wherein the first link bundle comprises a first plurality of sub-links;

responsive to the first detected failure, causing by the processing system communication of first re-directed network traffic via a first alternate tunnel instead of via the first primary tunnel, wherein the first alternate tunnel comprises the first starting router, the first ending router, and a first alternate link between the first starting router and the first ending router, wherein the first alternate link comprises a first alternate link bundle, wherein the first alternate link bundle comprises a first alternate plurality of sub-links; and wherein the first alternate link differs from the first link;

detecting, by the processing system, whether a second failure occurs on a second primary tunnel of the network, resulting in a second detected failure, wherein the second primary tunnel comprises a second starting router, a second ending router, and a second link between the second starting router and the second ending router, wherein traffic on the second primary tunnel comprises first priority level traffic and second priority level traffic, wherein the second link comprises a second link bundle, wherein the second link bundle comprises a second plurality of sub-links, wherein the second primary tunnel is different from the first primary tunnel, wherein at least a first portion of the first alternate tunnel is the same as at least a second portion of a second alternate tunnel, and wherein the second alternate tunnel has been pre-computed as an alternate tunnel for the second primary tunnel;

responsive to the second detected failure, detecting by the processing system whether total traffic, including the first re-directed network traffic, on the first portion of the first alternate tunnel is at or above a bandwidth threshold, resulting in a detected meeting of the bandwidth threshold;

responsive to the detected meeting of the bandwidth threshold, dynamically obtaining by the processing system for the second primary tunnel a corresponding back-up alternate tunnel from the second starting router to the second ending router, the back-up alternate tunnel being different from each of the second primary tunnel and the second alternate tunnel; and causing by the processing system communication of second re-directed traffic via the back-up alternate tunnel instead of via the second primary tunnel, wherein the second re-directed traffic comprises the first priority level traffic and excludes the second priority level traffic.

19. The method of claim 18, wherein:

the first priority level traffic is of a higher priority than the second priority level traffic.

20. The method of claim 18, wherein the dynamically obtaining for the second primary tunnel the corresponding back-up alternate tunnel is based upon historic information representing traffic that had been carried over the network, current information representing traffic that is being carried over the network, forecast information representing traffic that is forecast to be carried over the network, or any combination thereof.

* * * * *